United States Patent [19]

McGlew

[11] Patent Number: 4,850,298

[45] Date of Patent: * Jul. 25, 1989

[54] ENERGY SAVING BOAT DAVIT AND ARTICLE PLACEMENT DEVICE

[76] Inventor: John J. McGlew, Box 823 (E. Lake Rd.), Tuxedo Park, N.Y. 10987

[*] Notice: The portion of the term of this patent subsequent to Aug. 2, 2000 has been disclaimed.

[21] Appl. No.: 576,862

[22] Filed: Feb. 3, 1984

[51] Int. Cl.$^4$ .............................................. B63B 23/10
[52] U.S. Cl. .......................................... 114/373; 414/4
[58] Field of Search ................................ 114/369–374, 414/4, 138, 139, 140, 786; 901/2, 9

[56] References Cited

U.S. PATENT DOCUMENTS

| | | | |
|---|---|---|---|
| 1,455,159 | 5/1923 | Wright | 114/373 |
| 1,746,109 | 2/1930 | Edwards | 114/370 |
| 2,030,136 | 2/1936 | Carr | 114/370 |
| 3,092,856 | 6/1963 | Wallace | 114/373 |
| 4,139,110 | 2/1979 | Roberts | 114/373 |
| 4,271,553 | 6/1981 | Korsvik | 114/373 |
| 4,395,967 | 8/1983 | McGlew | 114/373 |

FOREIGN PATENT DOCUMENTS 1148365  4/1969  United Kingdom ................... 414/4

Primary Examiner—Joseph F. Peters, Jr.
Assistant Examiner—Clifford T. Bartz

[57] ABSTRACT

An article placement device particularly for marine use for selectively positioning a life boat in the water at a selected location from its associated ship comprises a programmable control for articulating a plurality of support elements or links which are pivotally interconnected and which may be selectively pivoted relative to each other for the placement of an article which is held at the upper end of the device. The programmable control is associated with each support element pivoting means which permits preselection of the amount of the pivoting of each interconnected support element so as to move the supported object such as a boat at a selected position both laterally and vertically away from the device. The articulated support elements may be pivoted under the control of pressure which is generated by the weight of the support elements themselves or by additional pressure forces or even a direct drive in the pivoting of the elements as selected before use so that the boat or other object held at the uppermost one will be moved through a lowering path which will place the boat in the sea at a desired location which is selected in accordance with the attitude of the vessel carrying the device before the programmable control is actuated. Support elements advantageously carry an outermost element such as a boat davit, breeches buoy, support cage, etc. The articulated support links may be pivoted by an amount, for example, to shift a breeches buoy or a fuel line outboard of the associated vessel or structure by a predetermined amount which is set by the pre-programming of the pivoting of the individual link support elements. Once the support elements are pivoted they are advantageously held in position such as by fluid or gear drive pressure or displaceable elements which are locked into portions of the pivoted element to retain it in a selected angle relative to the next adjacent element.

11 Claims, 4 Drawing Sheets

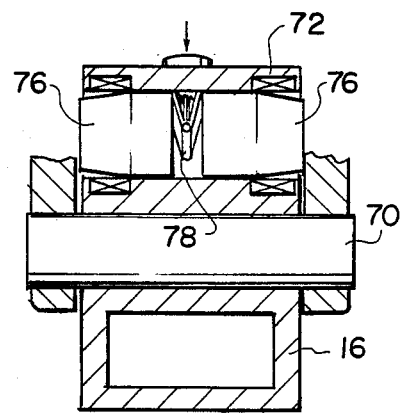
FIG. 5
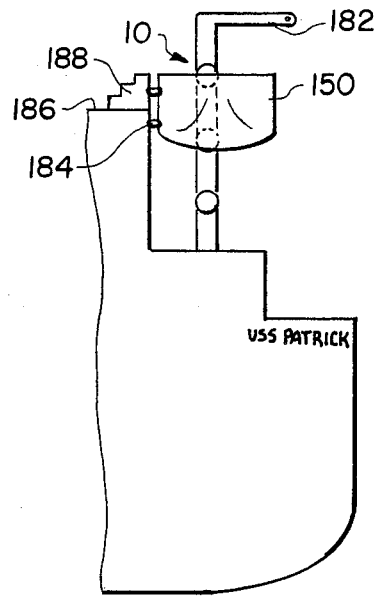
FIG. 10
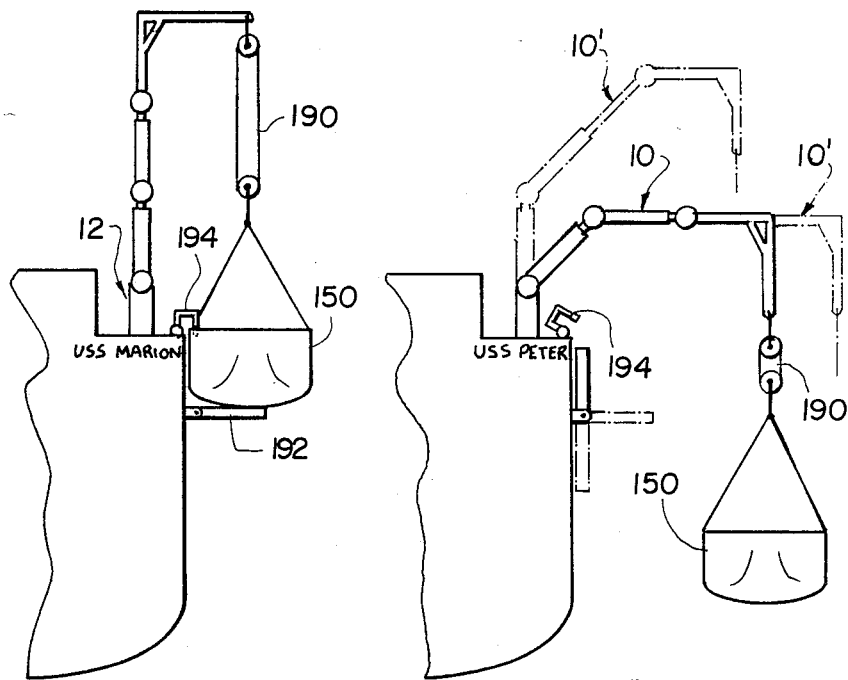
FIG. 11
FIG. 12

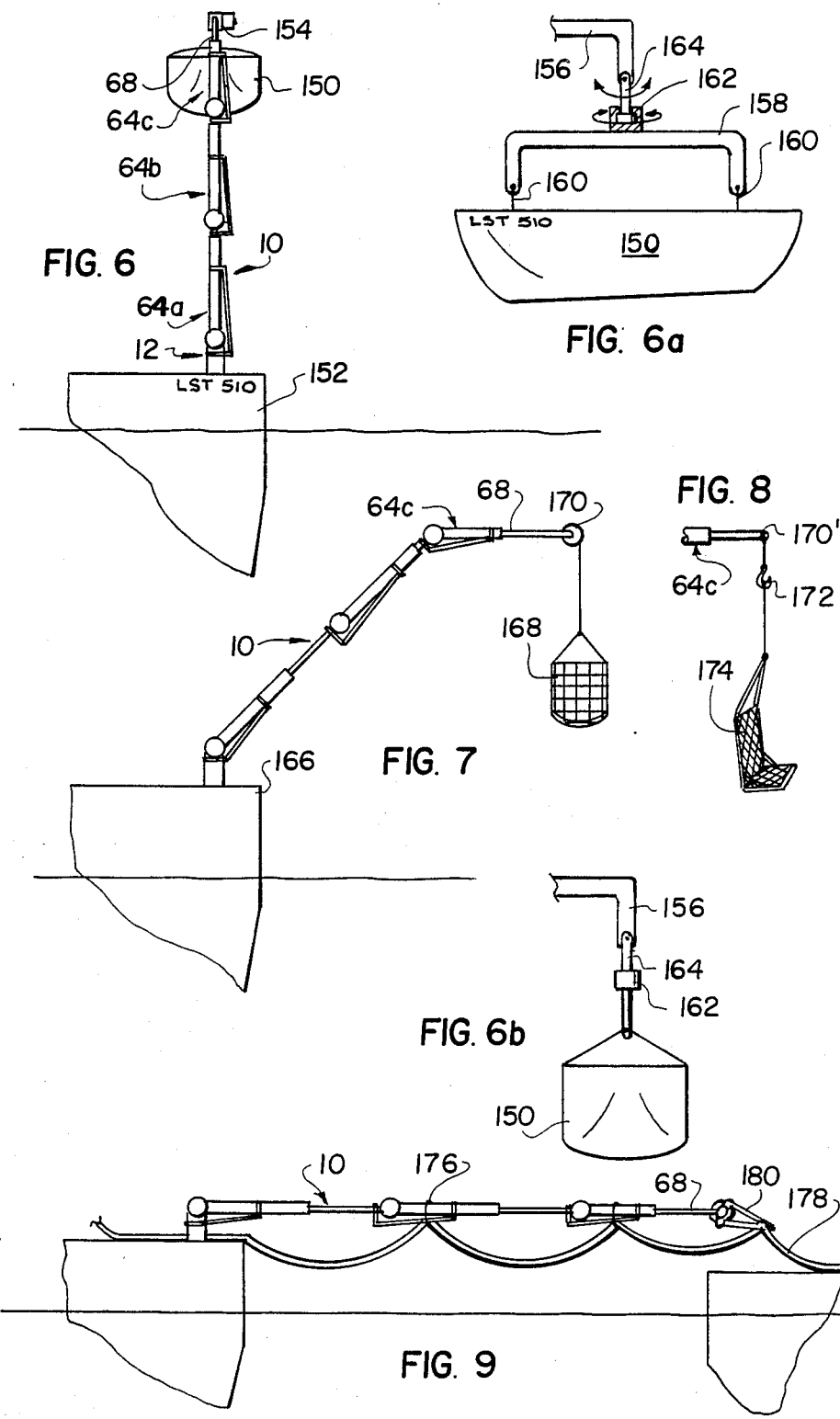

ENERGY SAVING BOAT DAVIT AND ARTICLE PLACEMENT DEVICE

FIELD AND BACKGROUND OF THE INVENTION

This invention relates in general to energy saving marine boat davits and in particular to a new and useful energy saving device for accurately positioning supported objects or an article, such as a boat, relative to the support structure carrying the device such as a ship's vessel.

REFERENCE TO ANOTHER PATENT

The present invention is an improvement over the invention disclosed and described in U.S. Pat. No. 4,395,967 which issued Aug. 2nd, 1983.

In the U.S. Pat. No. 4,395,967 there is described a device for accurately positioning a boat in respect to its associated vessel at a time when the boat must be launched from the vessel and it is desirable to place the boat at a selected location from the ship. The feature of the construction of the invention described in the patent is that the pivotal elements may be controlled so that the boat will be launched at desired spacing from the ship. The patent also covers the concept of using the fluid pressure generated by the weight of the elements and that the boat to be launched can and does provide an energy saving arrangement for lowering the life boats and a system which will be effective in the event that the power of the associated ship is not available.

Naturally fluid pressure operated devices are difficult to maintain in open seas where they are subject to corrosion and the action of weather on the various operating parts. Many variables must be considered in coordinating the tilt of the individual support elements so that the articles, or life boats, would be placed at a desired spacing from the support or vessel. Naturally such variables as the pounding sea conditions and weather generally are always taken into consideration in respect to the design details of such a device and these would be logically determined by the actual operation of a device of this nature during testing to ensure that the placement of the article or boat would be uniformed i.e. that the launching would always be the same for each selected setting. In many instances it is also desirable that the programmed setting which is once selected could be changed so that the tilting of the support elements, after initial selection had been made, could be changed even after the selection had been made and even after partial launching. In addition, consideration must be given as to how passengers would be loaded into a device which would be supporting a boat in a fluid pressure system which is always maintained under pressure. Also, such detailed considerations plus the survivability of such a system in severe sea operating conditions must be considered.

SUMMARY OF THE INVENTION

The present invention is an improvement over U.S. Pat. No. 4,395,967 in respect to the provision of a programmable control for selectively pivoting support elements in a system which may be operated using the fluid pressure generated by the weight of the structures or by separate control devices including direct separate drives, both mechanical and fluid pressure drives, as well as arrangement in which the operating pressures, or controls, may be obtained by hand operated elements or separate power driven motors either as a supplement or as a prime driving arrangement.

In accordance with the invention the supporting elements for the object to be supported and placed relative to the structure in which the device is mounted includes a mounting support defining a pressure chamber which is maintained under pressure by the weight of the device and also by an auxiliary separately driven power supply. In addition, the fluid pressure may be used not only to pivot the various supporting links but to also rotate the whole structure in the event that the direction of the movement of the support boat or other articles is to be changed. With the invention the fluid system may be operated by an additional power supplied by the associated vessel or by a hand operated pump. Fluid pressure may be used to rotate the device or additional hand or driving motor means may be associated with the device for effecting its rotation if such rotation is essential.

In accordance with the further aspect of the invention, a pressure source comprises a cylinder in which the lowermost support element is engaged. This lowermost support element may be separately supported in the cylinder so that the pressure produced by the weight of the device is no longer applied against the fluid pressure in the cylinder. Such an arrangement is of advantage when the device is to be used on a seagoing vessel which is maintained at sea for long periods of time. Whenever the pressure source is to be again generated a blocking device which releases the pressure may be easily withdrawn so that the pressure is again returned.

In accordance with another aspect of the invention, either a pressure, or electrical, or a mechanical drive to the various link elements which supports the article such as the boat are programmed by a program control which may be preset so as to pivot each support element by a selected amount and in accordance with where the article is to be placed. The program may be easily set so that once it is actuated, either with or without the use of additional power when the system is set in operation, the individual links will begin pivoting so as to move the device such as the boat into the water or to move another article such as a breeches buoy outwardly from the vessel so as to position it into the sea or into association with another vessel, for example.

In accordance with another aspect of the invention, the outermost one of the supporting elements may comprise for example a separate hoisting device having the usual pulleys and guide elements for effecting the hoisting of an article upwardly and downwardly from the outer end thereof. The outer end may contain a davit which may be a fixed davit or a rotatable davit or it may contain a hoist or a hook to other pivot elements which may be shifted in accordance with the articulation of the support elements relative to each other.

In still another important advantage of the mechanism of the invention, each of the support elements are made with one or more telescopic parts so that they may be extensible or retractable. This makes the device useful for many applications in addition to the use of a boat davit support. The device would have application in military fields, for example in assisting in landing helicopters by platforms supported at the outer end of the articulated device as well as for facilitating the launching or retrieval of weapons, VTOL aircraft, etc.

Accordingly it is an object of the invention to provide an improved article placement device which may be operated in a programmable manner and which may be rotated and either driven from a separate drive or from pressure generated by the weight of the device.

A further object of the invention is to provide a method of positioning articles relative to a boat using a support structure in which is mounted a plurality of pivotal support elements which are pivoted to each other and which may be pivoted by pivoting means to selected amounts using a programmable control associated with each support element pivoting means which comprises preselecting the pivoting of the selected support elements and the amount of this pivoting; and actuating the control so as to position the object at a selected distance both laterally and vertically in respect to the support.

A further object of the invention is to provide a device which may be used for many military and civilian uses particularly in association with seacraft, or the placement of articles relative to a support structure, and which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 5 is a section taken along the line V—V of FIG. 3;

FIG. 6 is a schematic end elevational view of the article placement device used as a boat davit;

FIG. 6a is a partial side elevational view of the davit shown in FIG. 6;

FIG. 6b is an end elevational view of the davit as shown in FIG. 6a;

FIG. 7 is a view similar to FIG. 6 showing the device used as an article hoisting and placement device;

FIG. 8 is a view similar to FIG. 7 showing the device used as holder for positioning a breeches buoy;

FIG. 9 is a view similar to FIG. 6 showing the device used for the placement of a fuel line from one vessel to another;

FIG. 10 is a schematic showing of an embodiment of the device used as a boat davit indicating the boat in a passenger loading position and with the boat stowed in a fixed position and with the support davit indicated outwardly for use for another placement chore;

FIG. 11 is a view similar to FIG. 10 indicating the device used with a boat which is arranged alongside of the side of the vessel in a stowed position;

FIG. 12 is a view similar to FIG. 11 showing the apparatus in a partially launched position; and FIG. 13 is a schematic view of the fluid drive motor operated by the article placement device and a gear drive for the individual supporting elements.

DESCRIPTION OF THE PREFERRED EMBODIMENTS

Figure 1:
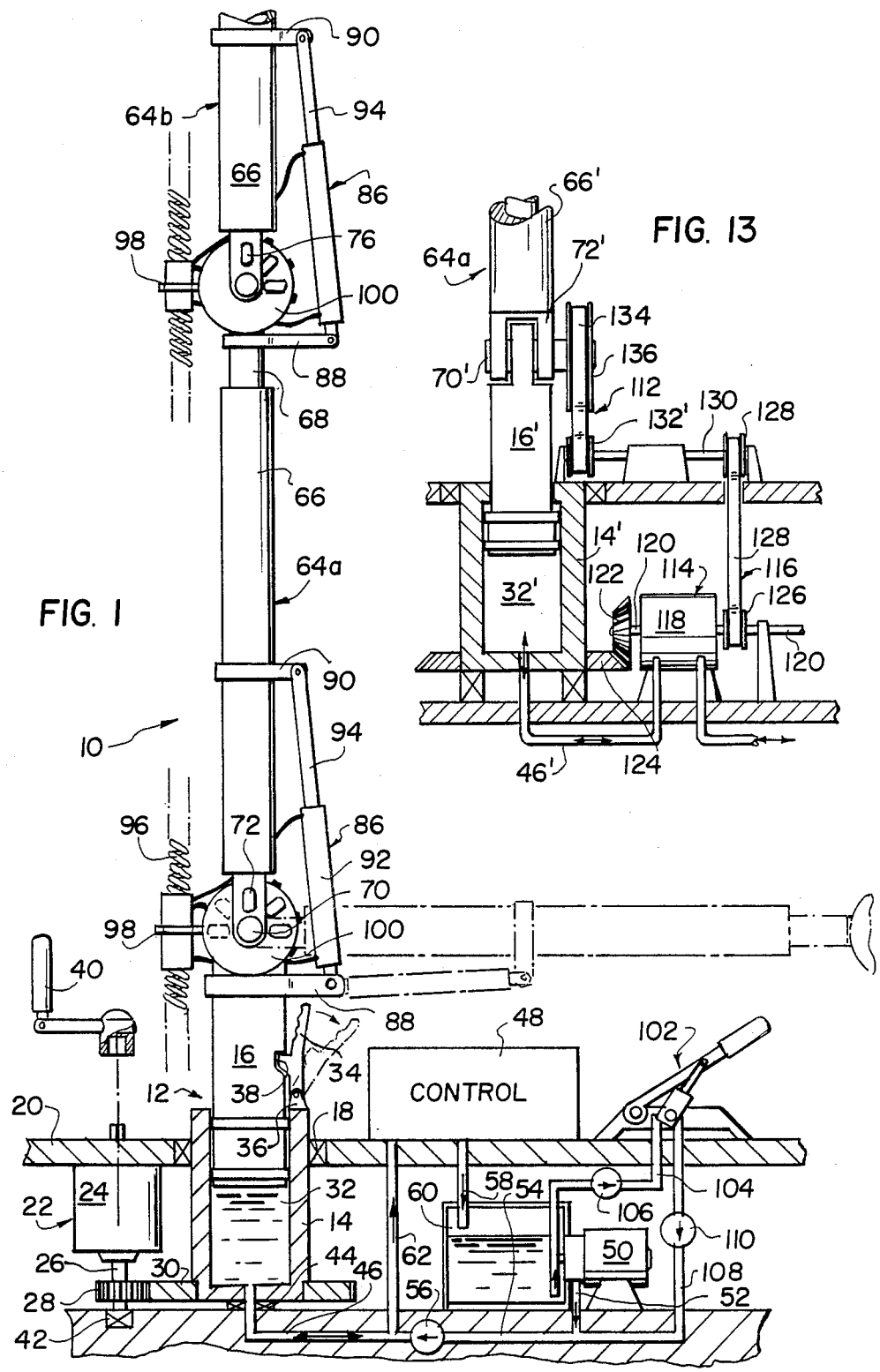
FIG. 1 is a partial side elevational and sectional view of a boat davit or article support structure constructed in accordance with the invention.

Referring to the drawings in particular the invention embodied therein comprises a new and useful energy saving boat davit or article handling device generally designated 10 in FIG. 1. The device 10 includes a base or support structure 12 which comprises a base fluid pressure cylinder 14 having a piston support element 16 movable therein.

In accordance with a feature of the invention, the support structure is mounted for rotation in bearings 18 on a support such as a ship's deck 20. Rotation means 22 are provided for rotating the support structure 12 which includes a drive motor 24 for rotating the base cylinder 14. The drive motor 24 advantageously comprises either an electrically operated motor or a motor which is operated from fluid pressure, provided by the weight of the support structures and the article held thereby, or, by a separate fluid pressure supply. The drive motor 24 includes a shaft 26 having a drive gear 28 which meshes with a driven gear 30 secured to the base fluid pressure cylinder 14. A motor 24 may be driven from pressure stored in the cylinder pressure chamber 32 whenever feasible in order to save energy. In seagoing conditions sometimes it is advantageous to support the piston support element 16 and those elements thereabove so that these elements do not influence the pressure in the chamber 32 and for this purpose a relieving lever 34 is pivotally mounted on a support 36 alongside the piston 16, so that it may be moved for example into engagement with a notched area 38 so that this element and those elements thereabove are supported through the relieving lever 34. It should be appreciated that the lever 34 is shown as only a schematic means for holding the piston 16 so that it does not provide a pressure force against the fluid in the chamber 32. Other means such as locking gearing etc. may be employed for this purpose.

In some instances it is desirable that the rotation of the support structure 12 be carried out manually for example by means of a rotatable handle 40 which is connected directly to shaft 26 so as to rotate the support structure through the gear 30 of the cylinder 14. Suitable bearing elements 42 and 44 are provided to support the shaft 26 for rotation and to provide an auxiliary support for the cylinder 14. In this latter case, the bearing 44 also has a seal associated with it for the passage of a conduit 46 which provides means for distributing a pressure control fluid through a control device 48.

In accordance with another feature of the invention, pressure may be supplied to the pressure chamber 32 from a separate pump motor device 50 which has a discharge 52 connected through a conduit 54 and a check valve 56 to the conduit 46. Pressurized fluid may be returned after passing through the control 48 and a conduit 58 into a reservoir 60. The pressurized control fluid is first supplied through a conduit 62 to the control 48 where it is used for controlling the amount of pivoting, the extension and withdrawal and the locking in a selected angle of a plurality of support elements 64a, 64b, 64c, etc.

In the embodiment of the invention shown in the support elements 64a, 64b and 64c etc. each comprise a telescopic assembly including an outer cylinder 66 and at least one cylinder or rod portion 68 which is telescoped within the cylinder 66. The control 48 is effective to control the amount of extension or retraction of the inner cylinder 68 relative to the outer cylinder 66.

Figure 4:
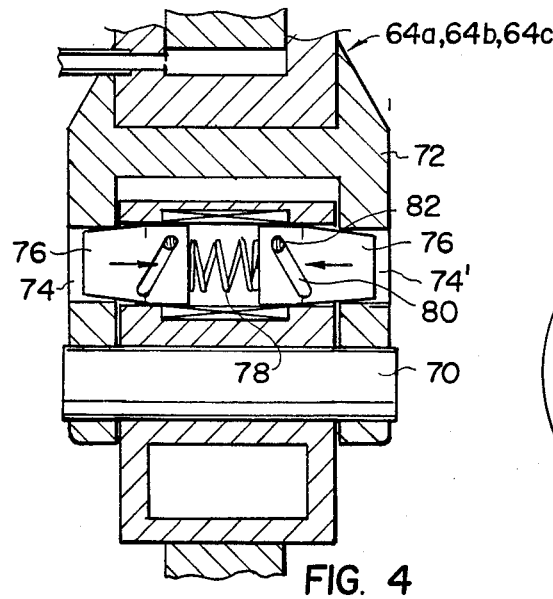
FIG. 4 is a section taken along the line IV—IV of FIG. 3.
Figure 3:
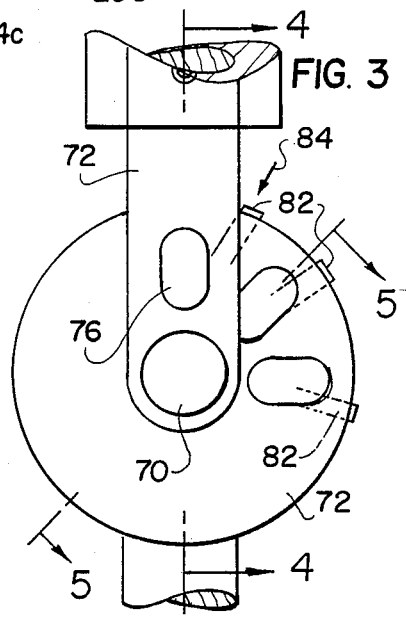
FIG. 3 is an enlarged partial elevational view indicating an embodiment of an arresting mechanism for controlling the position of the individual support element relative to each other.

In addition, the lowermost support piston 16 carries a horizontal pivot 70 on which the lowermost support element assembly 64a is pivotal. For this purpose, each support element outer cylinder 66 has an extension 72 which is journalled on the pivot 70 for pivotal movement. The extension has a recess for example on each side 74 and 74' as shown in FIG. 4 into which stopping plugs 76 are pushed to lock the support elements at selected angular positions relative to the support piston 16 or a next adjacent support element, for example 64b, 64c relative to each other. The locking plugs 76, as schematically shown in FIGS. 3 and 4 are advantageously forced into the associated recess 74 or 74' by fluid pressure sent by the control 48. Alternatively, they may be forced into position by a spring in which case spring 78 is a compression spring. Alternatively, the spring 78 may be designed as a spring which would cause withdrawal of the locking plugs from the recesses 74. The pins 76 are also provided with an oblique groove for a manual displacement pin 82 which may be driven, for example by a hammer blow in a direction of the arrow 84 so as to cause the associated locking pin 76 to move into receiving groove 74. In such a manner the selected angular position at the end of movement of the associated support element 64a may be controlled. This latter position is very important when the device is used as a boat davit support.

Ordinarily, when the device is used as a boat davit support all of the controls will be set at the control 48 to control the amount of pivoting of each of the support elements relative to each other and relative to the lowermost support piston 16. In the embodiment shown, pivotal movement is effected by actuating the fluid drive motor in the form of a piston and cylinder combination 86 which is articulated between a band 88 carried on a lowermost piston 16 or on the next adjacent support element 64a 64b or 64c, etc; and band element 90 secured to the outermost cylinder 66 of each of the support elements 64a, 64b, 64c, etc.

The piston and cylinder combinations includes a fluid pressure control cylinder 92 having a piston movable therein with a piston rod 94. The fluid pressure from the control 48 is supplied to the fluid drive motor 86 and also to the fluid pressure device for actuating the stopping plugs 76, for example through curled fluid pressure lines 96 supported on brackets 98 carried by disc-shaped parts 100 of each of the supporting elements.

In some instances it is desirable that fluid pressure be supplied to the cylinder 32 so as to change an initial locking setting for the pivotal movement of the supporting elements which is effected by the locking elements as shown in FIGS. 3 and 4. For this purpose, fluid may be supplied to the chamber 32 and to the control 48 by means of a hand pump generally designated 102 which is shown in FIG. 1. In the embodiment shown, this causes fluid pressure to move from the reservoir to a conduit 104 having a check valve 106 and be discharged through a conduit 108 having a check valve 110 into fluid pressure line 62.

In some instances it may develop that instead of having the fluid pressure drive motors 86, a gear drive generally designated 112 in FIG. 13 or even a combination of a rotary fluid drive 114 and a gear drive 116 as also shown in FIG. 13 may be used. In the embodiment shown in FIG. 13, the lowermost support comprises a piston element 16' which rides in cylinder 14' and the weight of the element produce a fluid pressure in the chamber 32' which is delivered through conduit 46' to a rotary fluid motor 118. The motor 118 is shown as having a shaft 120 with a bevel gear 122 which meshes with a bevel gear 124 affixed to cylinder 14'. This embodiment is a schematic indication of how the device could be used so that the pressure generated by the weight of the lowermost support elements and the upper elements as well as a boat or other article held thereby could be used to generate a fluid pressure to rotate the support as well as to articulate the various support elements 64a, 64b, etc.

The shaft 120 also carries a geared pulley 126 and in this case the gear drive comprises a belt 128 engaged over the pulley 126' and a pulley 128 affixed to a shaft 130 which has a pulley 132 driving a gear belt 134 and a pulley 136 which is carried on a pivot pin 70' secured to extension 72' of outer cylinder 66'. Naturally instead of belts, direct gearing may be used in those installations in which such an arrangement is feasible and perhaps even better. It is probable that the fluid system will be the least expensive and more practical in most conditions of use.

When the device is to be used as a boat davit it is desirable that the device be operative without any power being supplied from the ship. In one emergency condition the device can be used by supplying hand generated fluid power or gear power. Normally, however, the device may be preset so that operation will be carried out by a fluid pressure force produced by the weight of the structure itself. When it is desired to set this structure in accordance with the attitude of a ship or vessel with which the davit is associated, it is best that it can be easily set visually. Such a visual control would advantageously have depictions of the vessel with the davit showing the attitude selections that can be achieved and have each setting illustrated in respect to how far out the boat will be launched from the vessel with each type of setting and depending on each attitude of the vessel. For example, if the vessel is listing to the starboard it would probably be practical to effect a direct lowering of the boat without placing it far out from the side of the vessel on the starboard side but it would be more practical to direct the boat as far away from the vessel as possible on the port side. The control 48 advantageously includes depictions of this nature, with preferably a single button that would be pressed to achieve each depiction, that is each lowering of the boat so that the boat would be positioned precisely as desired in the water.

The control device 48, as mentioned previously, provides means for distributing a pressure control fluid to a cylinder space for example as shown in FIG. 9 of applicant's previous U.S. Pat. No. 4,395,967, owned by the present applicant for controlling the amount of pivoting of the support element 64a, 64b, 64c, etc. The same fluid control also is employed for extending and retracting those supports which are extensible. An example of another type of control is shown in respect to the control generally designated 132 and shown in FIG. 2 and which is connected similar to the control 48 and may be preset or programmed to effect the separate control of the various pivoting and extendable elements as desired.

Figure 2:
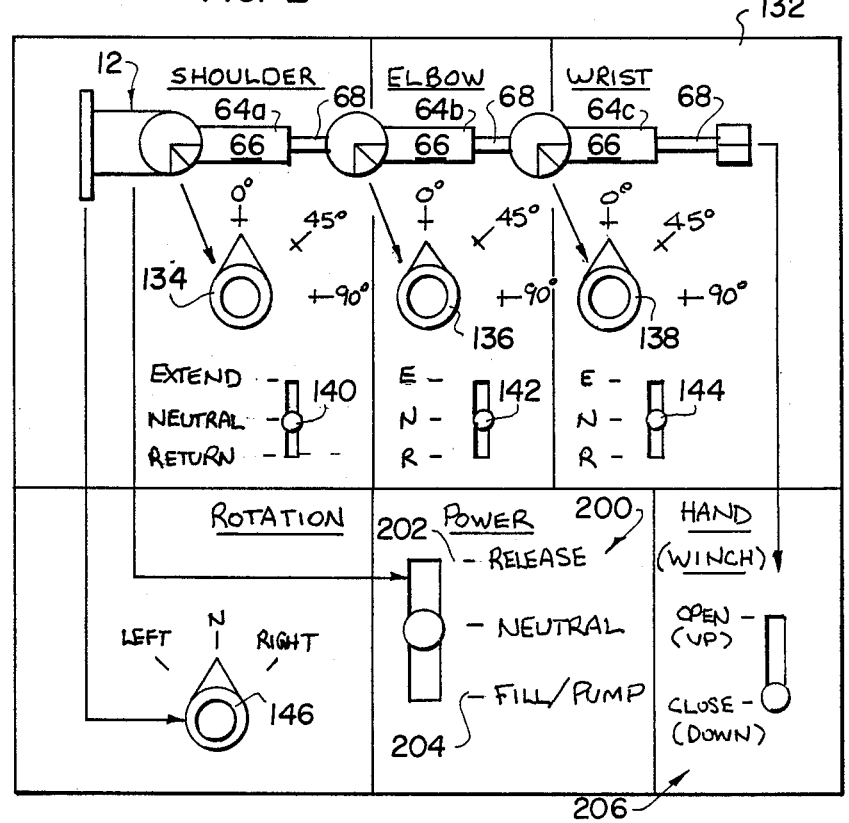
FIG. 2 is a schematic view of one embodiment of control panel for operation with the device.

The control 132 shown in FIG. 2 includes a control knob 134, 136 and 138 which as indicated permits a selection of the tilt angle of the support element telescopic assembly 64a, 64b and 64c, relative to each other and relative to the support structure 12. In the illustrated example, selections may be made between a zero angle or no tilting and anything up to 90°. The setting of this knob 134,136 and 138 actuates control 48 actuate the fluid drive motor 86 to move the piston with the associated piston rod 34 by a selected amount to effect the necessary tilting. Control knob 140,142 and 144 is associated with each support element telescopic assembly for extending and retracting the rod portion 68 relative to the outside cylinder 66. In the shown embodiment, there is indicated only an extended position and neutral position and a return position but additional positions of the telescopic member 68 may be set. The boat davit or article handling device 10 may also be rotated and such rotation is effected by turning a knob 116 either to the left or the right to effect the corresponding rotational movement of the device 10 as desired. This movement may be effected by controlling the motor 24 to effect the turning of the gears as desired in the selected direction or it may be done by hand or by the use of fluid pressure driving a motor to effect this rotation when the motor drive 21 is a fluid drive motor. The motor 118 shown in FIG. 13 would be effective to drive the gear drive connection to rotate the device in this manner. In addition the device may be operated manually to effect the rotation desired by the use of the hand crank 40. As shown in FIG. 6, the device 10 is used as a boat davit holding a life boat 150 which is suspended from a rod portion 68 of an uppermost support element telescopic assembly 64c. The suspension is advantageously from a block and tackle 152 connected to a cross davit member 154. After the passengers are loaded into a lifeboat 150, the device 10 is set so that when the final control knob is pulled, the control panel 132 and the support elements will pivot to each other or be held at the zero angle or no tilting relative to each other and the boat 150 will move outwardly from the ship 152 into the water. Setting of the tilting will control the position of the boat 150 relative to the support 12 or the side of the vessel 152. The modified boat holder for the device 10 includes a L-shaped davit support member 156 which is carried by the uppermost rod portion 68. Advantageously the rotatable boat support assembly 158 comprises an inverted U-shaped member which is connected to the boat 152 such as by movable lines 160 attached at fore and aft to the boat 152. The member 158 includes a pivotal block member 162 which is rotatable on a pivot arm 164 which is pivotally connected to the davit support member 156.

As shown in FIG. 7, a fixed support 166, such as a ship carries the device 10 in a position in which cargo or similar material 168 may be lifted and transported from the structure outwardly as desired. In this construction, the uppermost support element telescopic assembly 64c has a rod member 68 which is formed with hoisting gear 170. In the FIG. 8 embodiment the hoisting gear 170' includes a hook 172 for lifting a device such as a breeches buoy 174.

In the embodiment of FIG. 9, the device 10 becomes an extension device having holders 176 at spaced locations along the total length for transporting fuel line 178 which is manipulated by manipulatible arms 180 which is carried at the outer or uppermost rod member 68.

In FIG. 10 the device 10 has an uppermost L-shaped arm 182 which is shown in an active position after a boat 152 is secured by elements 181 alongside a loading deck 186 having an access 188 for passengers to enter into the boat 150.

FIG. 11 is a similar arrangement in which boat 150 is supported by block and tackle 190 which holds the boat 150 on a pivotal platform 192 which may be moved downwardly against the side of the vessel or upwardly against the side of the vessel or even withdrawn from the side after it has finished the task of supporting the boat together with a C-holder 194. The C-holder 194 may be pivoted upwardly as shown in FIG. 12 to release the boat which will also be released by the withdrawal of the platform 192 so that the weight of the boat will be exerted on the support 12 until the davit is pivoted from the dotted line position shown at 10' to either the solid line position shown at 10 or the second dotted line position shown at 10' shown in FIG. 12.

Thus the invention provides a device which is suitable not only for use out at sea as a boat davit but also for use at sea as an article placement device or placing personnel or objects into the water or onto another vessel or lifting the objects up to a higher elevation for working on board. On shore the device may be used as a boat support or lifting device or placement device just as it may be used on board a vessel. A feature of the inventive arrangement is the articulation of the individual support element and the fact that they may be controlled by either fluid pressure generated by their weight or by a separate fluid pressure or additional added fluid pressure supplied by an operating pump or motor. The drive may comprise a combination of both so as to save energy and in some cases the motor drive may be electric or even automotive and may be mechanical through gearing or belt drives or hydraulic or fluid pressure operated.

FIG. 2 also shows a portion 200 of control 132 used for control of the fluid pressure power in the cylinder 32 of FIG. 1 or 32' of FIG. 13. When a release control 202 is actuated the pressure in the cylinder may be released or e.g. liquid is circulated back to the reservoir 60 or alternatively the pressure from pump 50 is dumped or pump 50 is stopped. Bottom 204 advantageously starts pump 50 to pressurize the cylinder 32.

Section 206 provides a switch control for example, for the embodiment of FIGS. 7, 8 or 9.

I claim:

1. A method of positioning an article using a support structure with a plurality of support elements pivotally connected to each other adjacent their associated ends and connected to said support structure, and wherein each support element includes a support pivot supporting each of the support elements for pivotal movement about a substantially horizontal axis in respect to the next adjacent support element, and pivoting means connected to at least some of the support elements to pivot the associated element by a selected amount relative to the next adjacent element and using a programmable control associated with each support element pivoting means, which method comprises preselecting the pivoting of selected support elements by the programmable control and preselecting the amount of the pivoting of the selected support elements, and actuating the control so as to position the article at a selected spacing both laterally and vertically relative to said support structure.

2. A method according to claim 1, including supporting all of the support elements in a fluid pressure cylinder so as to generate an operating pressure for operating the supporting elements, and including providing means to support the elements independently of the fluid pressure cylinder so as to relieve the fluid pressure cylinder.

3. A method according to claim 1, including driving said support structure so as to rotate said support structure.

4. A method according to claim 2, including providing a separate pressure driving force to pressurize said fluid pressure cylinder.

5. A method according to claim 1, wherein the support elements are pivoted by separately driving them through a gear drive.

6. A method according to claim 1, wherein the support elements are supported by a fluid cylinder so that the weight of the support elements pressurize the fluid cylinder and including pumping pressure into the fluid cylinder by a hand pump.

7. A method according to claim 1, wherein said support structure is rotated by a hand operated drive.

8. A method according to claim 1, wherein the uppermost support element carries a boat davit including rotating the boat davit so as to position the boat relative to the support structure.

9. A method according to claim 1, wherein the uppermost support element comprises a hoist and wherein the hoist is operated to lift articles upwardly and downwardly.

10. A method according to claim 1, wherein said support elements are extensible and retractable and including operating said support elements to selectively extend and retract them.

11. A method according to claim 2, wherein the outermost support element carries an engaging arm including operatings of engaging arms to move a device therewith outwardly of the support structure.

* * * * *